United States Patent

Nakatsuji

[19]

[11] Patent Number: 5,975,172

[45] Date of Patent: Nov. 2, 1999

[54] PNEUMATIC TIRE

[75] Inventor: Hidekatsu Nakatsuji, Akashi, Japan

[73] Assignee: Sumitomo Rubber Industries, Ltd., Hyogo-ken, Japan

[21] Appl. No.: 08/941,394

[22] Filed: Sep. 30, 1997

[30] Foreign Application Priority Data

Oct. 1, 1996 [JP] Japan .................................. 8-260988

[51] Int. Cl.$^6$ .................................................. B60C 11/13
[52] U.S. Cl. ................................ 152/209.19; 152/DIG. 1
[58] Field of Search ........................... 152/209 R, 209 D, 152/DIG. 1

[56] References Cited

U.S. PATENT DOCUMENTS

| | | | |
|---|---|---|---|
| 4,345,632 | 8/1982 | Takigawa et al. | 152/209 R |
| 4,723,585 | 2/1988 | Mechtel | 152/209 R |
| 5,160,385 | 11/1992 | Goto et al. | |
| 5,361,815 | 11/1994 | Loser et al. | 152/209 R |
| 5,417,269 | 5/1995 | Kinoshita et al. | 152/209 R |
| 5,549,146 | 8/1996 | Trabandt et al. | 152/209 R |

FOREIGN PATENT DOCUMENTS

| | | | |
|---|---|---|---|
| 3-67706 | 3/1991 | Japan . | |
| 3-132403 | 6/1991 | Japan | 152/209 R |
| 903389 | 8/1962 | United Kingdom | 152/209 R |

*Primary Examiner*—Steven D. Maki
*Attorney, Agent, or Firm*—Birch, Stewart, Kolasch & Birch, LLP

[57] ABSTRACT

A pneumatic tire comprises a tread portion provided with tread grooves each having a bottom and sidewalls, the tread grooves provided with ejectors for preventing stone trapping. The ejectors protrude from the groove bottom independently of the sidewalls, the ejectors having a substantially triangular shape. The tread grooves comprise a main groove extending continuously in the tire circumferential direction, and the triangular ejectors are disposed in wide portions of the main groove. The wide portion has sidewalls flaring toward the center line of the main groove, and the triangular ejector disposed therein has two sides substantially parallel to the flaring sidewalls, respectively. The main groove is further provided with a continuous ejector extending along the length of the main groove, or a series of independent rectangular ejectors arranged along the length of the main groove at intervals.

7 Claims, 5 Drawing Sheets

PNEUMATIC TIRE

BACKGROUND OF THE INVENTION

The present invention relates to a pneumatic tire having tread grooves provided with triangular ejectors for preventing stone trapping.

In the land moving vehicles, particularly trucks, construction vehicles and like running on a gravel road, construction site and the like, small foreign objects such as stones are liable to be trapped in wide circumferential grooves, and the groove bottom is liable to be damaged during running.

A conventional method for preventing such stone trapping and damage therefrom is to dispose a circumferentially extending ridge in the bottom of a wide circumferential groove.

Japanese patent application No. JP-A-3-67706 discloses a heavy duty tire having at least two tread grooves, in which a ridge protruding from the groove bottom is formed in a point of intersection of the at least two grooves. The ridge has branches extending towards the respective grooves. As the ridge is supported by the radiated branches, its rigidity becomes relatively high. Therefore, if a stone is entered in a point of intersection, it is liable to be trapped therein and damage the groove.

SUMMARY OF THE INVENTION

It is therefore, an object of the present invention to provide a pneumatic tire in which trapped stones are easily ejected to prevent the groove bottom from being damaged.

According to one aspect of the present invention, a pneumatic tire comprises a tread portion provided with tread grooves each having a bottom and sidewalls, the tread grooves provided with ejectors protruding from the bottom independently of the sidewalls, and the ejectors having a substantially triangular shape.

Preferably, the height of the ejectors is in the range of from 0.07 to 0.35 times the depth of the tread groove. If the height is more than 0.35 times, an elastic force for ejecting trapped stones decreases, and the ejectors are liable to be broken at the root when relatively tall or bent in the middle when very tall. Further, the ejectors hinder the drainage of the groove.

If the height is less than 0.07 times, it is difficult to eject trapped stones and thus stone trapping is liable to occur.

The tread grooves comprise a main groove extending continuously in the tire circumferential direction.

Preferably, the main groove is provided with a continuous ejector extending along the length of the main groove, or a series of independent ejectors of another type such as a rectangle and the like arranged along the length of the main groove at intervals of a small distance.

The above-mentioned triangular ejectors are disposed in wide portions such as intersections of two or more grooves independently of the above-mentioned other type ejectors.

Accordingly, the stones coming into the grooves during running are hindered from touching to the groove bottom by the ejectors. Even if a stone is trapped in this part and the stone pushes the top of the ejector during running, as the ejector has a triangular shape, the apexes are liable to be moved easily, and the ejector is deformed by twisting itself. Therefore, the stone is repeatedly shaken or rolled during running and thus easily ejected.

The substantially triangular shape means that the corners between the three sides may be rounded or chamfered.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE INVENTION

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
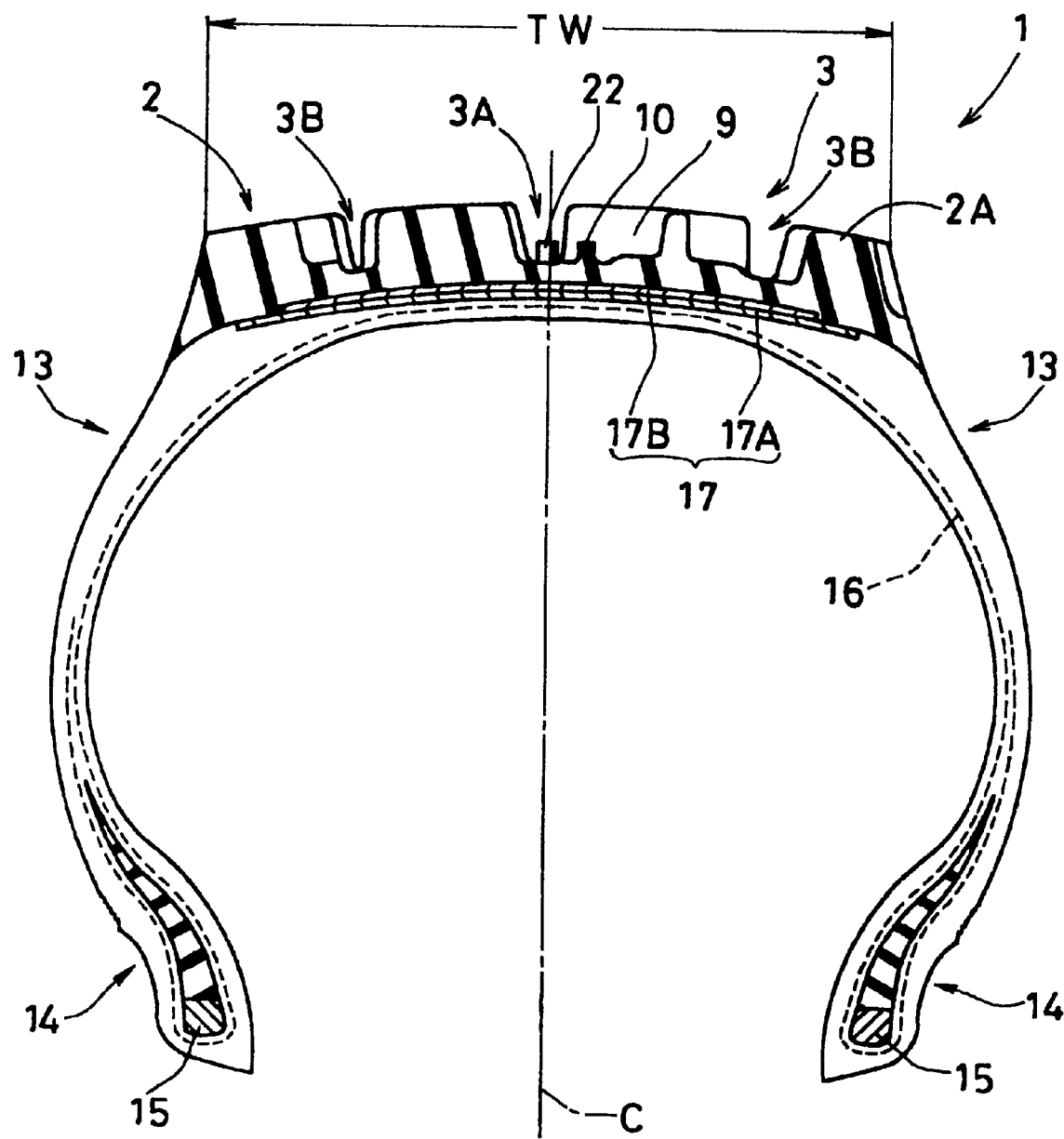
FIG. 1 is a cross sectional view of an embodiment of the present invention.

Embodiments of the present invention will now be described in detail in conjunction with the accompanying drawings.

In the figures, the pneumatic tire 1 according to the present invention is constructed as a heavy duty tire for trucks and buses.

The tire 1 comprises a tread portion 2, a pair of sidewall portions 13, a pair of bead portions 14 with a bead core 15 therein, a carcass 16 extending between the bead portions 14, and a belt 17 disposed radially outside the carcass 16 and inside the tread portion 2.

The carcass 16 comprises at least one carcass ply extending between the bead portions 14 and turned up around the bead cores from the axially inside to outside of the tire. Each carcass ply is made of cords arranged radially at an angle of from 90 to 70 degrees with respect to the tire equator C so as to have a radial or semiradial structure. For the carcass cords, steel cords and organic fiber cords, e.g. polyester, nylon, rayon, aromatic polyamide and the like may be used.

The belt 17 comprises at least two, usually two to four, plies of parallel cords. For the belt cords, steel cords and organic fiber cords, e.g. nylon, polyester, rayon, aromatic polyamide and the like may be used. In this example, two steel breaker plies 17A and 17B are disposed.

The tread portion 2 is provided with a plurality of main grooves 3 extending continuously in the tire circumferential direction. The main grooves may be straight or zigzag.

The sidewalls 5, 6, 7 of the main grooves 3 are inclined at an angle β of 3 to 20 degrees to a line N normal to the tread 2A so that the groove width becomes wider towards the radially outside.

The width WA, WB of the main grooves 3 at the bottom is in the range of from 0.025 to 0.06 times the tread width TW. The depth HA, HB thereof is in the range of from 0.08 to 0.16 times the tread width TW.

In the case of a tire size 285/75R24.5, the depth of the main grooves is about 21.0 mm.

Figure 2:
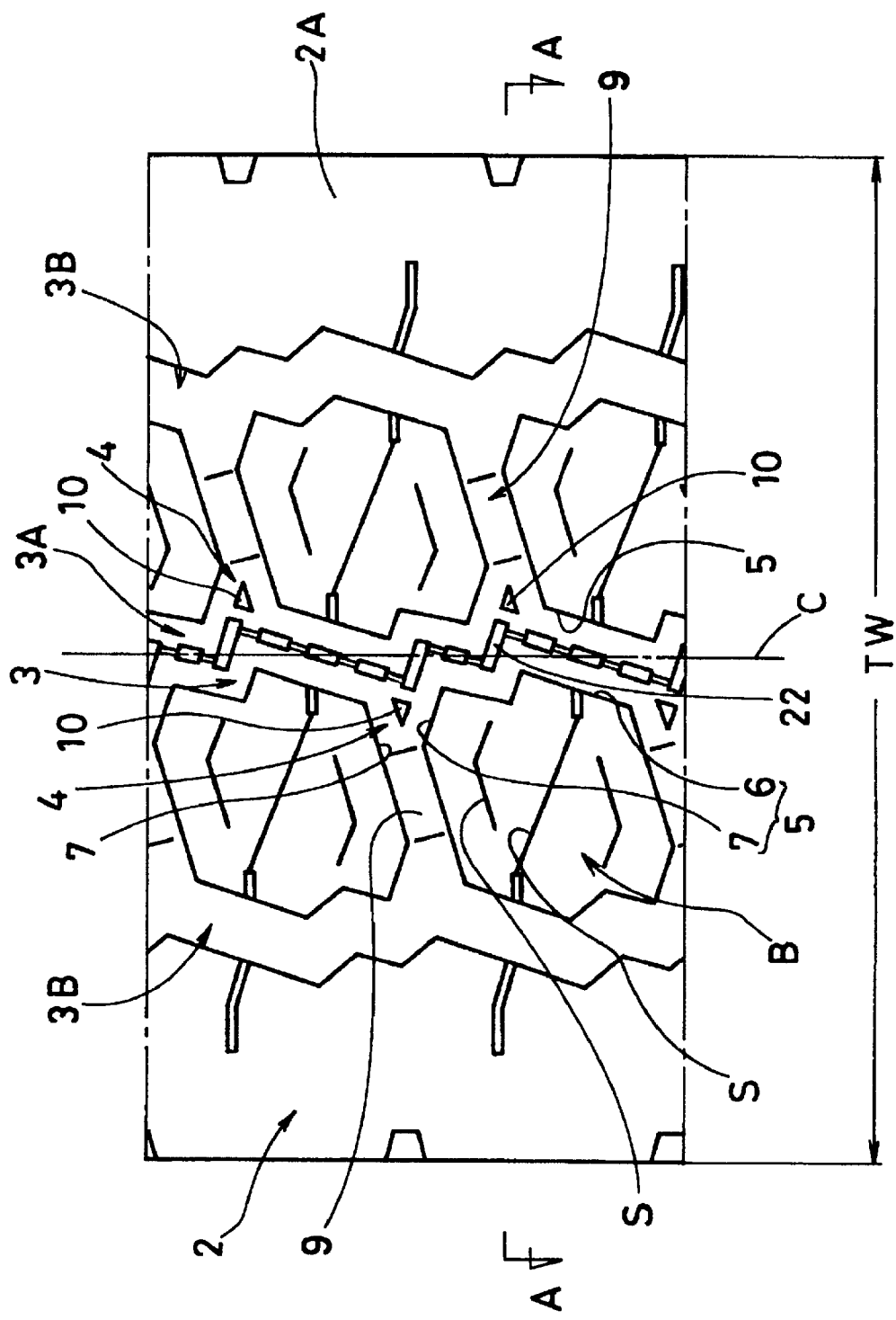
FIG. 2 is a developed plan view of the tread portion showing an example of the tread pattern.

In FIG. 2, the tread portion 2 is provided with a central main groove 3A disposed in the axial center of the tread, and a pair of side main grooves 3B each disposed between the tire equator C and one of the tread edges E. All of the grooves 3A and 3B are zigzag grooves.

The width WA of the central main groove 3A at the bottom is in the range of from 0.04 to 0.06 times the tread width TW. The width WB of the side main grooves 3B at the bottom is in the range of from 0.025 to 0.05 times the tread width TW. The depth HA of the central main groove 3A and the depth HB of the side main grooves 3B are in the range of from 0.08 to 0.16 times the tread width TW.

The width WA is larger than the width WB, but the depth HA is substantially the same as the depth HB.

Further, the tread portion 2 is provided with a plurality of axial grooves 9 so as to intersect the central main groove 3A and the side main grooves 3B.

Figure 3:
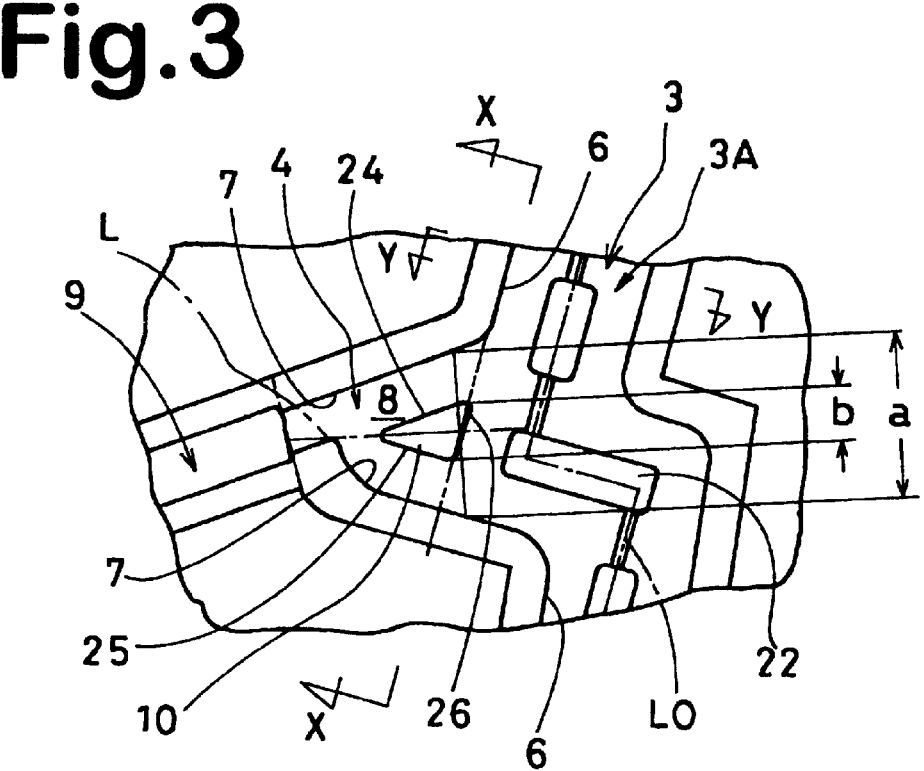
FIG. 3 is an enlarged partial view of the tread portion.
Figure 6:
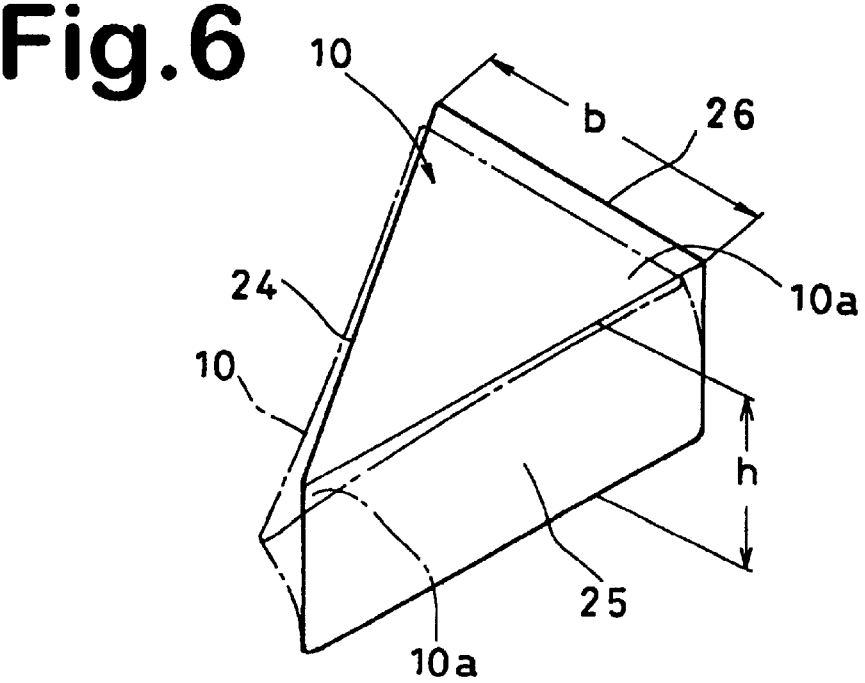
FIG. 6 is a perspective view of a protrusion explaining the function.
Figure 4:
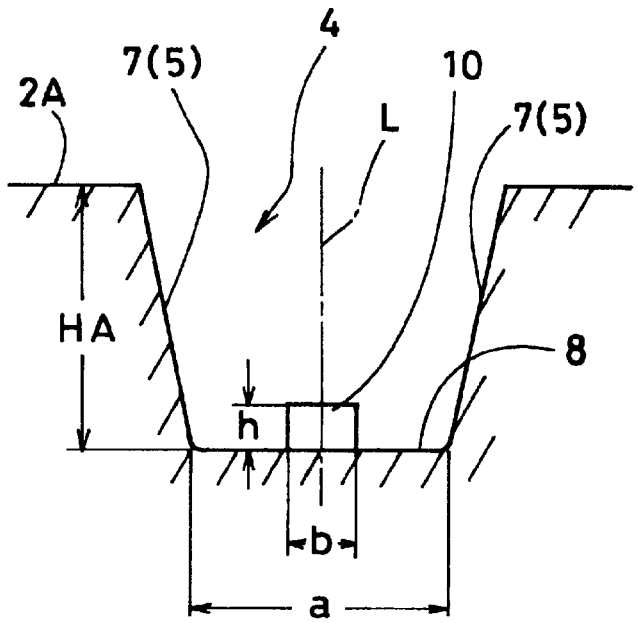
FIG. 4 is a cross sectional view taken along the line X—X of FIG. 3.
Figure 5:
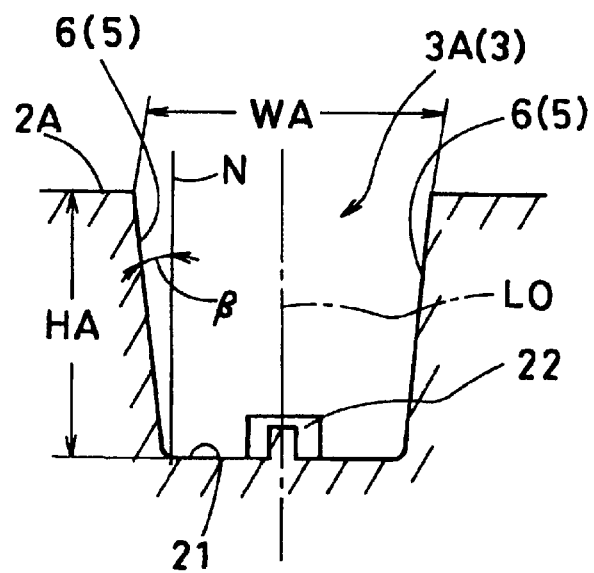
FIG. 5 is a cross sectional view taken along the line Y—Y of FIG. 3.

As shown in FIGS. 2 and 3, between the main grooves 3, 3A, 3B and the axial grooves 9, portions 4 flaring from the axial grooves toward the main grooves are formed. In other words, the width or distance between the sidewalls 7 of each flaring portion 4 increases toward the main groove center line LO.

The main groove 3A is provided on the center line LO with an ejector 22 extending continuously along the length thereof, the ejector 22 protruding radially outwardly from the groove bottom 21 and spaced apart from the sidewalls 6 of the main groove. The ejector 22 changes its width periodically. Thus, it looks like a series of alternate wider rectangles and narrow bars. Additionally, the height is changed periodically so that the wider rectangles are higher than the narrow bars.

In this example, a triangular ejector 10 is disposed in each of the flaring portions 4 such that two sides 24 and 25 are substantially parallel to the sidewalls 7 of the flaring portion 4. The remaining side 26 is oriented generally parallel to the longitudinal direction of the main groove in this example. The corners between the sides 24, 25 and 26 are slightly rounded.

The triangular ejector 10 stands independently of the continuous ejector 22. The height h of the triangular ejector 10 is the substantially same as or higher than the maximum height of the ejector 22.

In case of truck-bus tires, the height h of the ejector 10 is set in the range of from 1.5 to 7 mm, preferably 2.0 to 5.5 mm. In case of other type tires, e.g. relatively small tires for light trucks, jumbo tires for construction vehicles and the like, the height h is preferably set in the range of from 0.07 to 0.35 times the depth of the main groove in which the ejector is disposed. If the height h is less than 1.5 mm, stone trapping is liable to occur. If the height h is more than 7 mm, the force ejecting the trapped stone decreases.

As shown in FIG. 3, the maximum width (b) of the ejector 10 measured between the two sides 24 and 25 along the direction at a right angle to the center line L of the flaring portion 4 is in the range of from 20 to 60%, preferably 30 to 50% of the width (a) of the groove bottom measured at the same position along the same direction. If the width (b) is less than 20%, the pushing-out force to the entrapped stone of the ejector becomes insufficient and it becomes difficult to eject. If the width (b) is more than 60%, the rigidity of the ejector excessively increases and becomes stable. Thus, it is also difficult to eject.

The side main grooves 3B and axial grooves 9 are not provided with any protrusion such as the ejectors 10, 22. The groove bottom is flat. However, it is possible to dispose ejectors in the grooves 3B and 9.

In the embodiment shown in FIG. 2, the blocks B which are defined by the central main groove 3A, side main grooves 3B and axial grooves 9 are each provided with a plurality of axial sipes S to improve the grip performance.

Accordingly, the stones coming into the wide flaring portions during running are hindered from touching the groove bottom by the ejectors. Even if a stone is trapped in this portion and the stone pushes the top of the ejector during running, as the ejector has a triangular shape, the apexes are liable to be moved easily, and the ejector is deformed by twisting itself. Therefore, the stone in the wide flaring portion is repeatedly shaken during running and easily ejected.

Figure 7:
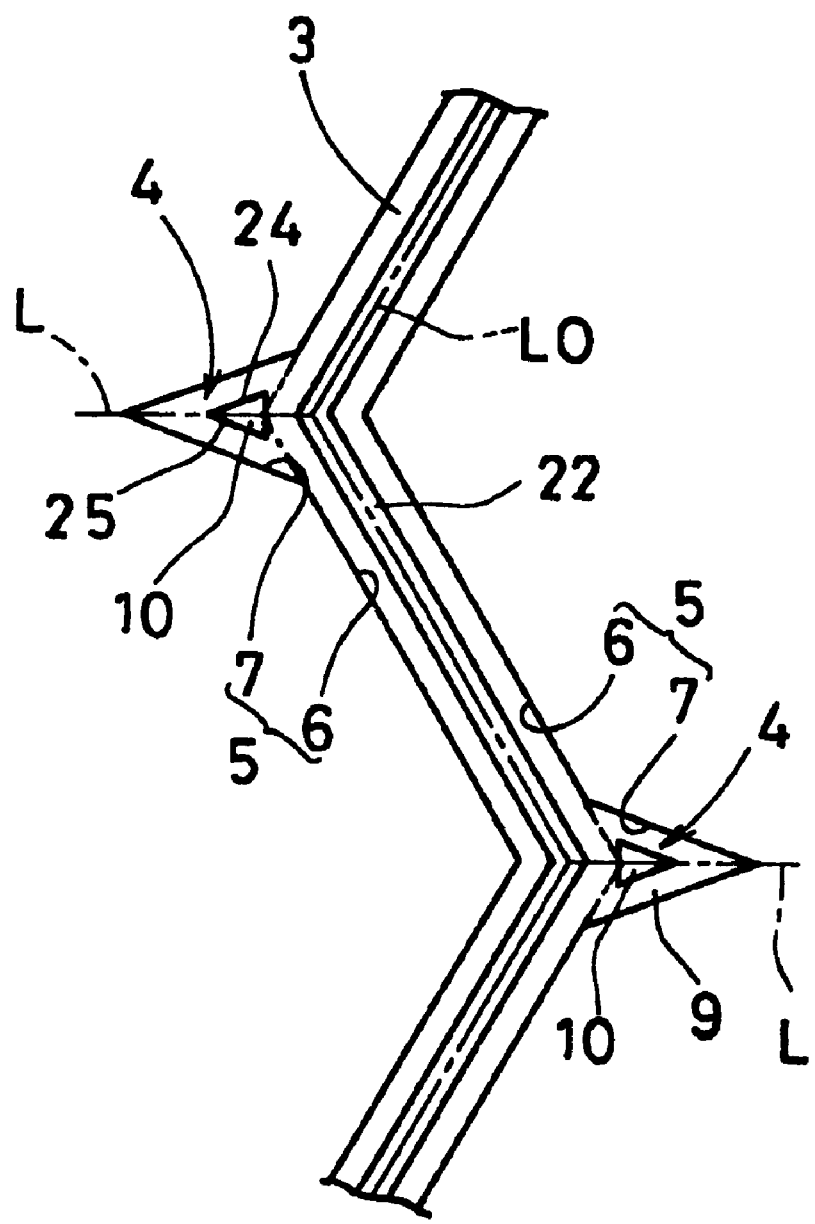
FIG. 7 shows another example of the tread groove.

In FIG. 7, the main groove 3 has a zigzag configuration, and a continuous ejector 22 is disposed along the center line LO, leaving a distance from the sidewalls 6. The continuous ejector 22 in this example has a constant width and a constant height. The main groove 3 is provided in the zigzag points with flaring portions 4, each extending into the adjacent rib but terminated in the rib, without connecting with any groove. Each flaring portion is provided with a triangular ejector 10. The two sides 24 and 25 are substantially parallel to the sidewalls 7 of the flaring portion 4.

Comparison Test

Test tires of size 285/75R24.5 having the same tread pattern as shown in FIG. 2 excepting the ejector were made, changing the b/a ratio and height h as shown in Table 1, and tested for stone trapping and damage therefrom.

In the test, a test vehicle provided with test tires was run on a gravel road for 32000 km distance and then the tires were inspected. The test results are shown in Table 1.

From the test results, it was confirmed that the groove bottom and ejectors of the example tires according to the invention were less damaged in comparison with the reference tires and prior art tire, and thus the durability was improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| Tire | Ejector | | Number of trapped stones (/tire) | State of Damage | |
|---|---|---|---|---|---|
| | b/a | h (mm) | | Max. Depth of damage in groove bottom (mm) | Damage and Number of damaged ejector (/tire) |
| Prior | non | | 23.4 | 4.0 | — |
| Ex. 1 | 0.2 | 4 | 8.0 | under 1 | chip 2 or 3 |
| Ex. 2 | 0.3 | 4 | 7.7 | under 1 | chip 1 or 2 |
| Ex. 3 | 0.4 | 4 | 6.8 | 0 | chip 1 or 2 |
| Ex. 4 | 0.5 | 4 | 8.6 | 0 | chip 1 or 2 |
| Ex. 5 | 0.6 | 4 | 10.2 | 0 | chip 1 or 2 |
| Ref. 1 | 0.1 | 4 | 17.5 | 3 | chip 7 or 8 crack 3 |
| Ref. 2 | 0.7 | 4 | 16.8 | 0 | chip 1 or 2 |
| Ex. 11 | 0.4 | 1.5 | 11.0 | under 1 | crush 2 or 3 |

TABLE 1-continued

| Tire | Ejector b/a | Ejector h (mm) | Number of trapped stones (/tire) | Max. Depth of damage in groove bottom (mm) | Damage and Number of damaged ejector (/tire) |
|---|---|---|---|---|---|
| Ex. 12 | 0.4 | 2 | 9.8 | under 1 | crush 1 or 2 |
| Ex. 13 | 0.4 | 5.5 | 6.0 | 0 | chip 1 or 2 |
| Ex. 14 | 0.4 | 6 | 5.3 | 0 | chip 1 or 2 |
| Ex. 15 | 0.4 | 7 | 5.8 | 0 | chip 1 or 2 crack under 1 |
| Ref. 11 | 0.4 | 1 | 18.4 | 3 | crush 10 to 12 |
| Ref. 12 | 0.4 | 8 | 6.0 | 0 | chip 3 or 4 crack 2 or 3 |

Groove depth H = 20.6 mm
Number of triangular ejectors = 112/tire

I claim:

1. A pneumatic tire comprising:
a tread portion provided with tread grooves each having a bottom and sidewalls, the tread grooves comprising a main groove extending continuously in the tire circumferential direction,
the tread grooves provided with ejectors protruding from the bottom independently of the sidewalls,
the ejectors having a substantially triangular shape,
said triangular ejectors are disposed in wide portions of the main groove, and
the main groove is further provided independently of said triangular ejectors with
a continuous ejector extending along the length of the main groove, or
a series of independent rectangular ejectors arranged along the length of the main groove at intervals.

2. The pneumatic tire according to claim 1, wherein
each said wide portion has sidewalls flaring toward the center line of the main groove, and
the triangular ejector disposed therein has two sides substantially parallel to the flaring sidewalls, respectively.

3. The pneumatic tire according to claim 2, wherein
each said wide portion connects with an axial groove, and
the maximum width of the ejector measured along a direction at a right angle to the center line of the flaring wide portion is in the range of from 20 to 60% of the width of the groove bottom measured at the same position along the same direction.

4. The pneumatic tire according to claim 3, wherein
the maximum width of the ejector measured along the direction at a right angle to the center line of the flaring wide portion is in the range of from 30 to 50% of the width of the groove bottom measured at the same position along the same direction.

5. The pneumatic tire according to claim 1, wherein
the height of the ejectors is in the range of from 0.07 to 0.35 times the depth of a tread groove.

6. The pneumatic tire according to claim 5, wherein
the height of the ejectors is set in the range of from 1.5 to 7 mm.

7. The pneumatic tire according to claim 6, wherein
the height of the ejectors is set in the range of from 2.0 to 5.5 mm.

* * * * *